US012544858B2

(12) United States Patent
Wang et al.

(10) Patent No.: US 12,544,858 B2
(45) Date of Patent: Feb. 10, 2026

(54) LASER WELDING METHOD AND LASER WELDING DEVICE

(71) Applicant: Panasonic Intellectual Property Management Co., Ltd., Osaka (JP)

(72) Inventors: Jingbo Wang, Hyogo (JP); Tsutomu Sugiyama, Osaka (JP); Shunsuke Kawai, Osaka (JP); Kenzo Shibata, Hyogo (JP); Masashi Ishiguro, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 736 days.

(21) Appl. No.: 17/935,111

(22) Filed: Sep. 25, 2022

(65) Prior Publication Data

US 2023/0013501 A1 Jan. 19, 2023

Related U.S. Application Data

(63) Continuation of application No. PCT/JP2021/016754, filed on Apr. 27, 2021.

(30) Foreign Application Priority Data

May 14, 2020 (JP) .................................. 2020-085345

(51) Int. Cl.
*B23K 26/21* (2014.01)
(52) U.S. Cl.
CPC .................................... *B23K 26/21* (2015.10)

(58) Field of Classification Search
CPC ................ B23K 26/073; B23K 26/082; B23K 26/0869; B23K 26/0876; B23K 26/0892;
(Continued)

(56) References Cited

U.S. PATENT DOCUMENTS

| 2018/0354070 A1 | 12/2018 | Nogami |
| 2020/0122271 A1 | 4/2020 | Kobayashi |

(Continued)

FOREIGN PATENT DOCUMENTS

| CN | 107755912 | 3/2018 |
| CN | 110153557 | 8/2019 |

(Continued)

OTHER PUBLICATIONS

International Search Report of PCT application No. PCT/JP2021/016754 dated Jul. 6, 2021.

(Continued)

*Primary Examiner* — Hung D Nguyen
(74) *Attorney, Agent, or Firm* — Wenderoth, Lind & Ponack, L.L.P.

(57) ABSTRACT

A laser welding method includes a welding step of applying a laser beam to a surface of a workpiece while the laser beam is caused to advance in an X-direction and scanning with the laser beam is simultaneously performed in a Y-direction intersecting the X-direction. The welding step includes a first weaving step of causing the laser beam to weave in the Y-direction with first amplitude ($A_1$), and a second weaving step of causing the laser beam to weave with a predetermined amplitude smaller than first amplitude ($A_1$) at both end portions of a weaving trajectory drawn by the laser beam in the first weaving step.

19 Claims, 13 Drawing Sheets

(58) Field of Classification Search
CPC ...... B23K 26/20; B23K 26/206; B23K 26/21; B23K 26/24; B23K 26/34; B23K 26/342
See application file for complete search history.

(56) References Cited

U.S. PATENT DOCUMENTS

2020/0147723 A1* 5/2020 Speker ................... B23K 26/26
2020/0180077 A1   6/2020 Riquelme et al.
2020/0376598 A1   12/2020 Watanabe et al.

FOREIGN PATENT DOCUMENTS

| | | | |
|---|---|---|---|
| DE | 10 2014 206 302 | 10/2015 | |
| EP | 3 441 178 | 2/2019 | |
| JP | 3965754 B | 8/2007 | |
| JP | 2014-205166 | 10/2014 | |
| JP | 2014205166 A * | 10/2014 | ............. B23K 26/34 |
| JP | 2016-123981 | 7/2016 | |
| JP | 2016123981 A * | 7/2016 | |
| JP | 6588498 B | 10/2019 | |
| JP | 2020-062682 | 4/2020 | |
| WO | 2019/030249 | 2/2019 | |
| WO | 2019/044380 | 3/2019 | |

OTHER PUBLICATIONS

Communication pursuant to Article 94(3) EPC issued Jul. 17, 2024 in corresponding European Patent Application No. 21 803 453.6.
Extended European Search Report issued Oct. 2, 2023 in corresponding European Patent Application No. 21803453.6.

* cited by examiner

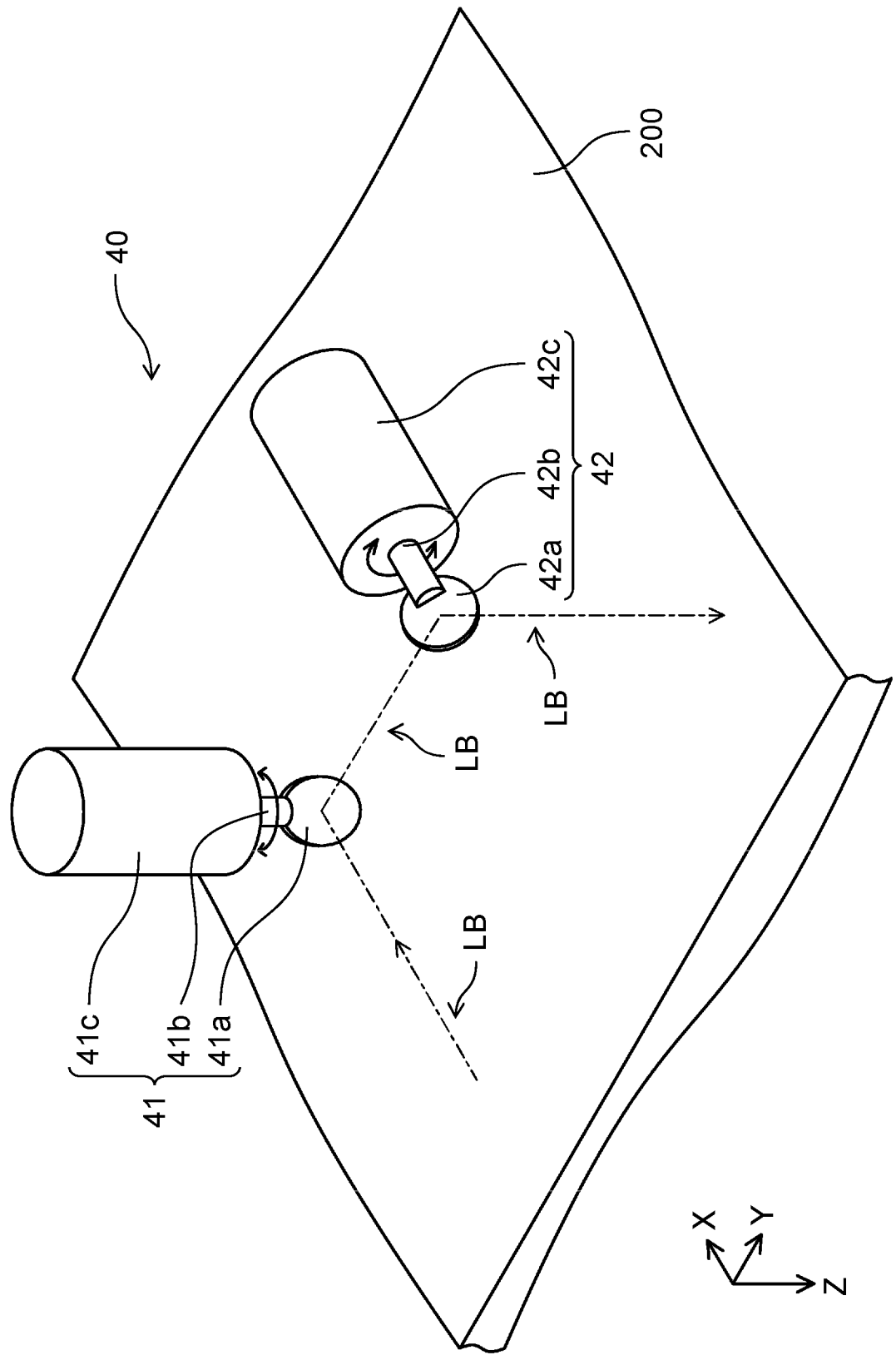

FIG. 10

| END PORTION IN -Y-DIRECTION OF FIRST WEAVING TRAJECTORY | END PORTION IN +Y-DIRECTION OF FIRST WEAVING TRAJECTORY | | |
|---|---|---|---|
| | THIRD WEAVING | FIFTH WEAVING | SEVENTH WEAVING | NINTH WEAVING |
| FOURTH WEAVING | ILLUSTRATED IN FIG. 4 | ○ | ○ | ○ |
| SIXTH WEAVING | ○ | ILLUSTRATED IN FIG. 6 | ○ | ○ |
| EIGHTH WEAVING | ○ | ○ | ILLUSTRATED IN FIG. 7 | ○ |
| TENTH WEAVING | ○ | ○ | ○ | ILLUSTRATED IN FIG. 8 | ated application of the PCT International Application No. PCT/JP2021/016754 filed on Apr. 27, 2021, which claim the benefit of foreign priority of Japanese patent application No. 2020-085345 filed on May 14, 2020, the contents all of which are incorporated herein by reference.

LASER WELDING METHOD AND LASER WELDING DEVICE

This application is a continuation application of the PCT International Application No. PCT/JP2021/016754 filed on Apr. 27, 2021, which claim the benefit of foreign priority of Japanese patent application No. 2020-085345 filed on May 14, 2020, the contents all of which are incorporated herein by reference.

TECHNICAL FIELD

The present disclosure relates to a laser welding method and a laser welding device.

BACKGROUND ART

Laser welding can perform high-speed and high-quality welding because a laser beam, which is applied to a workpiece serving as an object to be welded, has high power density. In particular, in scanning welding where welding is performed while a surface of a workpiece is scanned with a laser beam at a high speed, it is possible to significantly reduce operation time of a robot or the like for moving a laser head retained thereby without processing. Therefore, this scanning welding enables welding with a shorter takt time.

It is, however, necessary to reduce a spot diameter of the laser beam. Thus, in a case, such as butt welding, where a gap is likely to be formed at a welding portion of the workpiece, there is a possibility that the laser beam penetrates through the gap. In a case where the laser beam penetrates through the gap, as described above, amount of metal melted by the laser beam may not be sufficient to fill the gap. Thus, there is a possibility that an excellent weld bead cannot be formed.

To solve these problems, there have been conventionally proposed methods of performing laser welding, and in each of the methods, the laser welding is performed while a laser beam is caused to weave at a high speed on a surface of a workpiece (see, for example, Patent Literatures 1 and 2).

CITATION LIST

Patent Literatures

PTL 1: Japanese Patent No. 3965754
PTL 2: Japanese Patent No. 6588498

SUMMARY OF THE INVENTION

Technical Problems

In each of the respective, conventional laser welding methods disclosed in Patent Literatures 1 and 2, the laser beam is applied uniformly to the entire weaving range.

However, when the laser beam is caused to weave in a predetermined direction, heat diffusion from a molten portion of the workpiece to the surrounding portion at both end portions of a trajectory drawn with the weaving occurs more largely than such heat diffusion occurs at other portions. Thus, both end portions of the weaving trajectory receive reduced, effective heat input from the laser beam. In a joint in butt welding performed under different plate thicknesses, or in a joint in lap welding performed even when plates have the same thickness, thermal imbalance occurs at both end portions of the weaving trajectory. Thus, it is difficult to excellently form a weld bead.

The present disclosure has been made in view of the above points, and it is an object of the present disclosure to provide a laser welding method and a laser welding device with which a weld bead having an excellent shape can be formed in laser welding where weaving is performed.

Solutions to Problems

To achieve the above object, a laser welding method according to the present disclosure includes a welding step of applying a laser beam to a surface of a workpiece while the laser beam is caused to advance in a first direction and the laser beam is simultaneously caused to weave in a second direction intersecting the first direction. The welding step includes a first weaving step of causing the laser beam to weave in the second direction with a first amplitude, and a second weaving step of causing the laser beam to weave with a predetermined amplitude smaller than the first amplitude at least at one end portion of a weaving trajectory drawn by the laser beam in the first weaving step.

A laser welding device according to the present disclosure includes a laser oscillator that is configured to generate a laser beam, a laser head that is configured to receive the laser beam and that is configured to apply the laser beam to a workpiece, and a controller that is configured to control operation of the laser head. The laser head includes a laser beam scanner that is configured to perform scanning at least in a second direction intersecting a first direction that is an advancement direction of the laser beam. The controller is configured to drive-control the laser beam scanner to cause the laser beam to weave in the second direction with a first amplitude, and to cause the laser beam to weave with a predetermined amplitude smaller than the first amplitude at least at one end portion of a weaving trajectory, with the first amplitude, drawn by the laser beam.

Advantageous Effect of Invention

According to the laser welding method and the laser welding device of the present disclosure, it is possible to form a weld bead having an excellent shape in laser welding where weaving is performed.

BRIEF DESCRIPTION OF THE DRAWINGS

FIG. 2 is a schematic configuration view of a laser beam scanner.

FIG. 10 is a diagram illustrating an example of combinations of weaving methods of a laser beam according to a fourth modified example.

DESCRIPTION OF EMBODIMENTS

Hereinafter, exemplary embodiments of the present disclosure will be described with reference to the drawings. The following description of preferable exemplary embodiments is merely illustrative in nature, and is not intended to limit the present disclosure, its application, or its use.

[Configurations of Laser Welding Device and Laser Beam Scanner]

Figure 1:
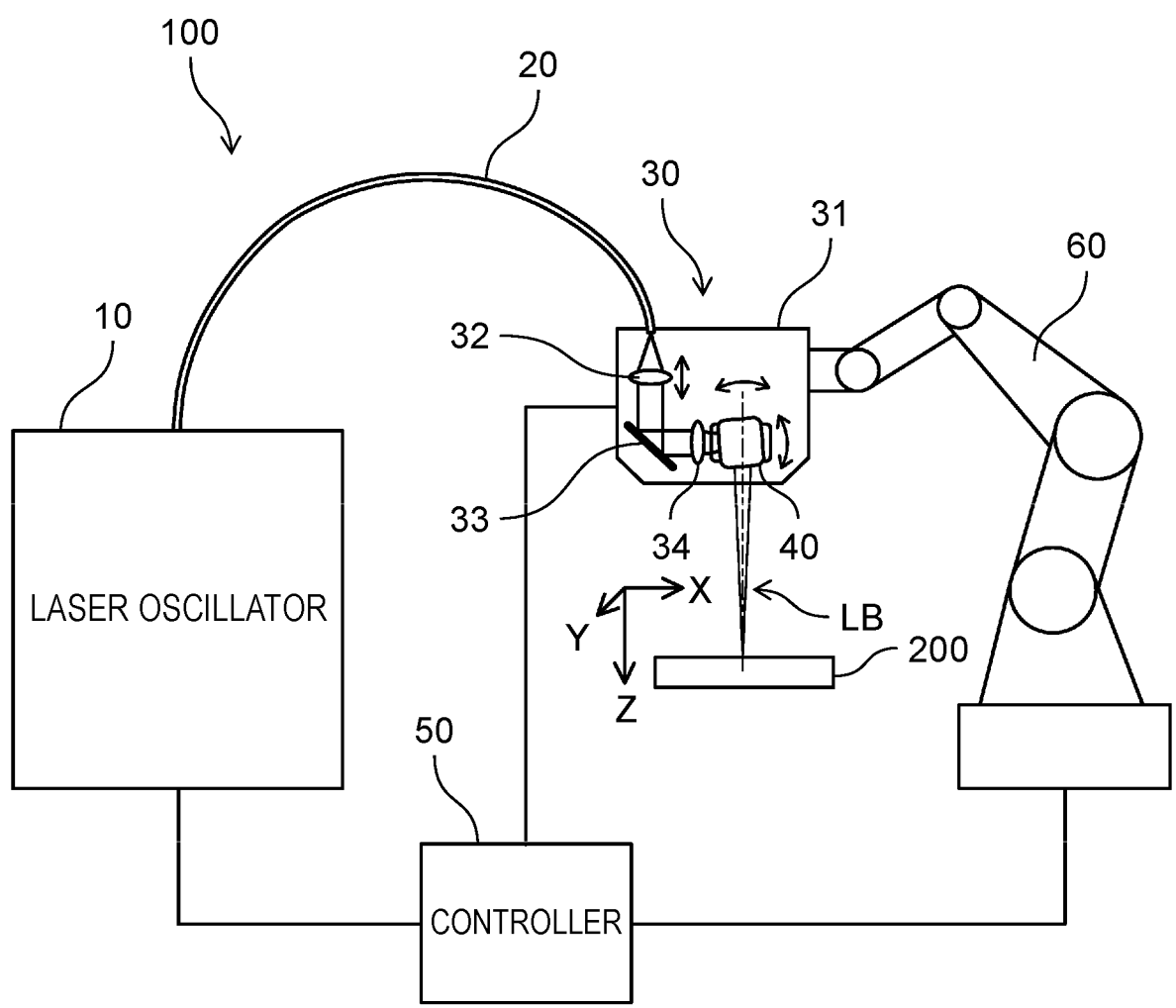
FIG. 1 is a schematic configuration view of a laser welding device according to a first exemplary embodiment.
Figure 3A:
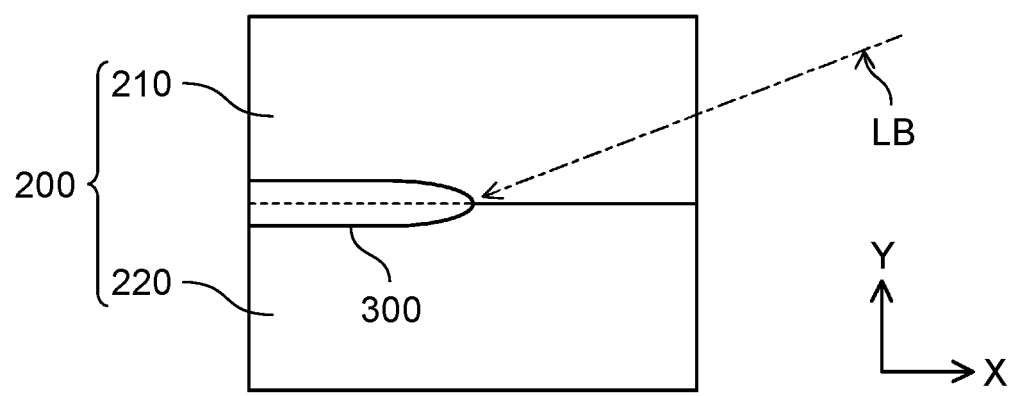
FIG. 3A is a schematic diagram of a workpiece.
Figure 3B:
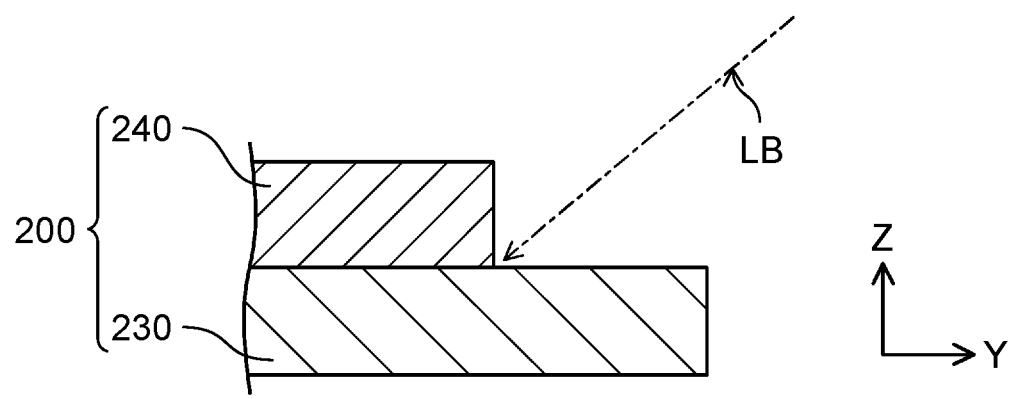
FIG. 3B is a schematic diagram of another workpiece.

FIG. 1 illustrates a schematic diagram of a configuration of a laser welding device according to the present exemplary embodiment, and FIG. 2 illustrates a schematic configuration view of a laser beam scanner. FIG. 3A illustrates a schematic diagram of a workpiece, and FIG. 3B illustrates a schematic diagram of another workpiece.

In the following description, a direction parallel to an advancement direction of laser beam LB from reflection mirror 33 toward laser beam scanner 40 may be referred to as an X-direction, a direction parallel to an optical axis of laser beam LB emitted from laser head 30 may be referred to as a Z-direction, and a direction orthogonal to each of the X-direction and the Z-direction may be referred to as a Y-direction. When a surface of workpiece 200 is formed as a flat surface, the XY plane including the X-direction and the Y-direction therein may be substantially parallel to the surface of workpiece 200, or may form a certain angle with respect to the surface of workpiece 200. As will be described later, the X-direction corresponds to the longitudinal direction of weld bead 300 (see FIG. 3A) formed in workpiece 200, and the Y-direction corresponds to the width direction of weld bead 300.

As illustrated in FIG. 1, laser welding device 100 includes laser oscillator 10, optical fiber 20, laser head 30, controller 50, and manipulator 60.

Laser oscillator 10 is a laser light source that is supplied with power from a power supply (not illustrated), and that generates laser beam LB. Laser oscillator 10 may include a single laser light source, or may include a plurality of laser modules. In the latter case, each laser beam emitted from a corresponding one of the plurality of laser modules is combined into and then emitted as laser beam LB. The laser light source or the laser modules used in laser oscillator 10 are appropriately selected in accordance with a material, a form of a part to be welded, or the like of workpiece 200.

For example, a fiber laser or a disk laser, or an yttrium aluminum garnet (YAG) laser can be used as the laser light source. In this case, the wavelength of laser beam LB is set in a range from 1000 nm to 1100 nm, inclusive. A semiconductor laser may be also used as the laser light source or the laser module. In this case, the wavelength of laser beam LB is set in a range from 800 nm to 1000 nm, inclusive. A visible-light laser may be also used as the laser light source or the laser module. In this case, the wavelength of laser beam LB is set in a range from 400 nm to 600 nm, inclusive.

Optical fiber 20 is optically coupled to laser oscillator 10, and laser beam LB generated in laser oscillator 10 is incident to optical fiber 20 and then transmitted through the inside of optical fiber 20 toward laser head 30.

Laser head 30 is attached to an end portion of optical fiber 20, and applies laser beam LB, which has been transmitted from optical fiber 20, to workpiece 200.

Laser head 30 includes collimation lens 32, reflection mirror 33, condenser lens 34, and laser beam scanner 40, which serve as optical components, and these optical components are housed inside housing 31 with arrangement thereof having a predetermined relationship.

Collimation lens 32 receives laser beam LB emitted from optical fiber 20. Collimation lens 32 converts laser beam LB into collimated light, and causes the collimated light to be incident on reflection mirror 33. Collimation lens 32 is connected to a drive portion (not illustrated), and is configured to be allowed to shift in the Z-direction in response to a control signal from controller 50. By causing collimation lens 32 to shift in the Z-direction, the focal position of laser beam LB can be caused to change, which then allows laser beam LB to be applied appropriately in accordance with the form of workpiece 200. That is, collimation lens 32, in combination with the drive portion (not illustrated), also functions as a focal position adjustment mechanism for laser beam LB. The focal position of laser beam LB may be changed by causing condenser lens 34 to shift using a drive portion.

Reflection mirror 33 reflects laser beam LB transmitted through collimation lens 32, and causes laser beam LB to be incident to laser beam scanner 40. Reflection mirror 33 is provided with a surface forming an angle of about 45 degrees with respect to the optical axis of laser beam LB transmitted through collimation lens 32.

Condenser lens 34 condenses, on the surface of workpiece 200, laser beam LB, which has been reflected by reflection mirror 33, and which then has been subjected to scanning performed by laser beam scanner 40.

As illustrated in FIG. 2, laser beam scanner 40 is a known galvano-scanner, which includes first galvano-mirror 41 and second galvano-mirror 42. First galvano-mirror 41 includes first mirror 41a, first rotation shaft 41b, and first drive portion 41c. Second galvano-mirror 42 includes second mirror 42a, second rotation shaft 42b, and second drive portion 42c. Laser beam LB transmitted through condenser lens 34 is reflected at first mirror 41a, and is further reflected at second mirror 42a. Then, laser beam LB is applied to workpiece 200.

For example, first drive portion 41c and second drive portion 42c are motors, and first rotation shaft 41b and second rotation shaft 42b are output shafts of the motors. Although not illustrated, when first drive portion 41c is rotationally driven by a driver that operates in response to a control signal from controller 50, first mirror 41a, attached to first rotation shaft 41b, is caused to rotate about the axis of first rotation shaft 41b. Similarly, when second drive portion 42c is rotationally driven by a driver that operates in response to a control signal from controller 50, second mirror 42a, attached to second rotation shaft 42b, is caused to rotate about the axis of second rotation shaft 42b.

The rotary motion of first mirror 41a about the axis of first rotation shaft 41b to a predetermined angle causes scanning with laser beam LB in the X-direction. The rotary motion of second mirror 42a about the axis of second rotation shaft 42b to a predetermined angle causes scanning with laser beam LB in the Y-direction. That is, laser beam scanner 40 is configured to perform one-dimensional or two-dimensional scanning with laser beam LB within the XY plane, and thus is configured to apply laser beam LB to workpiece 200.

Controller 50 controls laser oscillation of laser oscillator 10. Specifically, controller 50 performs the laser oscillation control by providing control signals for an output current, on/off time, and the like to the power supply (not illustrated) connected to laser oscillator 10.

Controller 50 also controls operation of laser head 30 in accordance with content of a selected laser welding program. Specifically, controller 50 drive-controls laser beam scanner 40 provided in laser head 30, and the drive portion (not illustrated) that is used for collimation lens 32 provided in laser head 30. Controller 50 further controls operation of manipulator 60. The laser welding program is stored in a storage (not illustrated) provided inside controller 50 or at another place, and is invoked in controller 50 by a command from controller 50.

Controller 50 includes an integrated circuit (not illustrated) such as a large-scale integration (LSI) or a microcomputer. When the laser welding program, which is software, is performed on the integrated circuit, the above-described functions of controller 50 are implemented.

Manipulator 60 is an articulated robot, and is attached to housing 31 of laser head 30. Manipulator 60 is connected to controller 50 with a signal therebetween transmittable and receivable. Manipulator 60 causes laser head 30 to move such that a predetermined trajectory is drawn in accordance with the laser welding program described above. Another controller (not illustrated) may be provided for controlling the operation of manipulator 60.

Laser welding device 100 illustrated in FIG. 1 can perform laser welding on workpieces 200 having various forms. For example, as illustrated in FIG. 3A, butt welding is performed by applying laser beam LB to a joint of workpiece 200 in which first plate member 210 and second plate member 220 are butted against each other at respective end surfaces thereof. As a result, weld bead 300 extending in the X-direction is formed. As illustrated in FIG. 3B, lap fillet welding is performed by applying laser beam LB to a corner of a joint of workpiece 200 in which third plate member 230 and fourth plate member 240 are overlapped with each other with respective end surfaces thereof shifted from each other. However, it is needless to say that forms of workpieces 200 to be subjected to laser welding are not limited to the examples illustrated in FIGS. 3A and 3B.

Figure 4A:
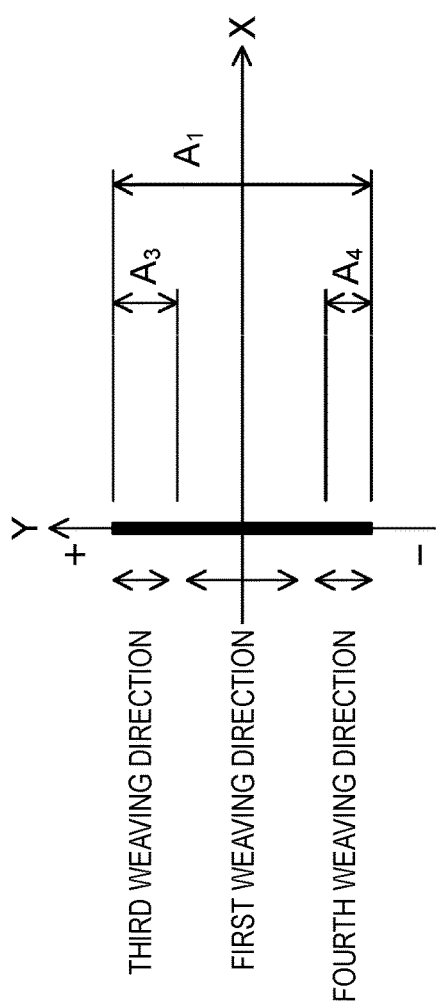
FIG. 4A is a diagram illustrating each weaving trajectory of a laser beam.
Figure 4B:
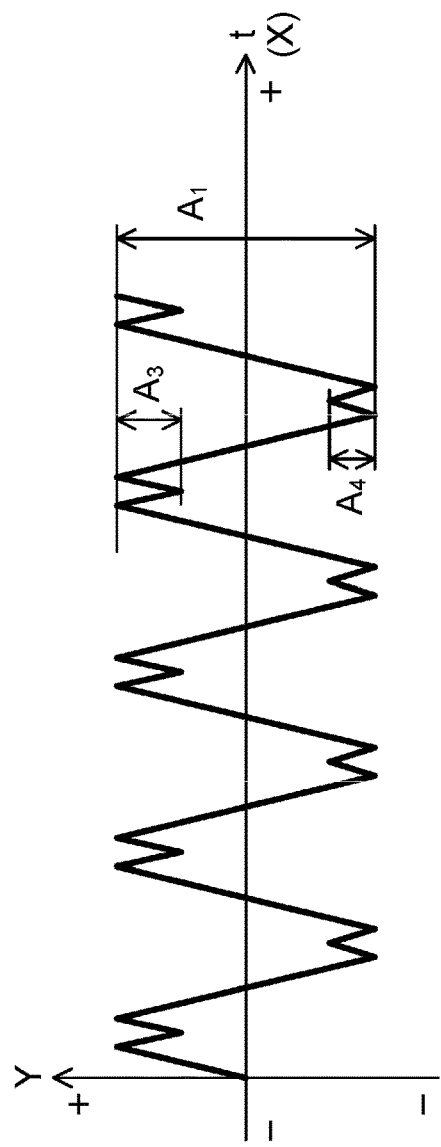
FIG. 4B is a diagram illustrating a temporal change in the weaving trajectory of the laser beam.

[Laser welding method] FIG. 4 illustrates each weaving trajectory of a laser beam and a temporal change therein. In FIG. 4 and each of the subsequent drawings, a movement direction of laser head 30, that is, an advancement direction of laser beam LB is defined as a +X-direction, and a direction opposite to the +X-direction is defined as a —X-direction. In the Y-direction, as illustrated in FIG. 4, a direction extending from a line indicating the X-direction toward the upper side of the plane of the paper is defined as a +Y-direction, and a direction opposite to the +Y-direction is defined as a −Y-direction.

Part (a) of FIG. 4 illustrates each weaving trajectory of laser beam LB in a state where the position of laser head 30 is fixed, and part (b) of FIG. 4 illustrates a temporal change in the weaving trajectory. Part (b) of FIG. 4 corresponds to a weaving trajectory of laser beam LB on the surface of workpiece 200 when laser head 30 is caused to move in the X-direction at a constant speed.

In the present description, "weaving (or weave)" means that while laser beam LB is caused to move in a predetermined advancement direction (welding direction), scanning is performed with laser beam LB along a trajectory different from the trajectory drawn by this movement or at a speed different from the speed of this movement. For example, when, while laser beam LB is caused to advance in the +X-direction, laser beam LB is caused to weave by linearly reciprocating laser beam LB at a speed having a fixed value in the Y-direction, a trajectory drawn by laser beam LB is a weaving trajectory having a triangular waveform (see part (b) of FIG. 5). When, while laser beam LB is caused to advance in the +X-direction, the laser beam is caused to weave in a circular manner in a predetermined direction, a trajectory drawn by laser beam LB is a weaving trajectory having a helical shape (see part (b) of FIG. 12). As described above, using laser welding device 100 enables laser welding in which various types of weaving trajectories are drawn.

As illustrated in part (a) of FIG. 4, a laser beam is caused to weave by reciprocating the laser beam so as to draw a first weaving trajectory having a linear shape, along the Y-direction (first weaving, a first weaving step). That is, laser beam LB is caused to weave in the width direction of weld bead 300 (see FIG. 3A). The amplitude of the first weaving trajectory in the Y-direction is first amplitude $A_1$.

At an end portion in the +Y-direction of the first weaving trajectory, laser beam LB is caused to weave by reciprocating laser beam LB one time so as to draw a third weaving trajectory having a linear shape, along the Y-direction (third weaving). At an end portion in the −Y-direction of the first weaving trajectory, laser beam LB is caused to weave by reciprocating laser beam LB one time so as to draw a fourth weaving trajectory having a linear shape, along the Y-direction (fourth weaving). The operations of the third weaving and the fourth weaving are collectively referred to as a second weaving step. Note that operations of weaving further performed at both end portions of the first weaving trajectory in first to fourth modified examples described below are also referred to as the second weaving step.

The amplitude of the third weaving trajectory in the Y-direction is third amplitude $A_3$, and the amplitude of the fourth weaving trajectory in the Y-direction is fourth amplitude $A_4$. As illustrated in part (b) of FIG. 4, the number of weaving times of laser beam LB is one at each end portion in the +Y-direction or each end portion in the −Y-direction.

The first weaving (the weaving direction: the +Y-direction), the third weaving, the first weaving (the weaving direction: the −Y-direction), and the fourth weaving are performed in this order, and each of these steps is repeated a plurality of times in this order. As a result, a weaving trajectory of laser beam LB on the time axis has a triangular waveform with first amplitude $A_1$ as illustrated in part (b) of FIG. 4. A triangular waveform with third amplitude $A_3$ is superimposed on a vertex in the +Y-direction of the triangular waveform with first amplitude $A_1$, and a triangular waveform with fourth amplitude $A_4$ is superimposed on a vertex in the −Y-direction of the triangular waveform with first amplitude $A_1$. That is, laser beam LB is caused to weave in the width direction of weld bead 300 at end portions, i.e., edges, in the width direction of weld bead 300.

Third amplitude $A_3$ may be the same as fourth amplitude $A_4$ or different from fourth amplitude $A_4$. For example, third amplitude $A_3$ may be larger than fourth amplitude $A_4$ or smaller than fourth amplitude $A_4$. In any of these cases, it is preferable that the sum of third amplitude $A_3$ and fourth amplitude $A_4$ is smaller than first amplitude $A_1$, and it is more preferable that the sum of third amplitude $A_3$ and fourth amplitude $A_4$ is smaller than or equal to half of first amplitude $A_1$.

By applying laser beam LB to the surface of workpiece 200 while laser beam LB is caused to advance in the +X-direction and laser beam LB is simultaneously caused to weave in the Y-direction as described above, workpiece 200 is subjected to laser welding, as a result of which, for example, weld bead 300 illustrated in FIG. 3A is formed (a welding step).

Effects and the Like

As described above, the laser welding method according to the present exemplary embodiment includes the welding step of applying laser beam LB to the surface of workpiece 200 while laser beam LB is caused to advance in the X-direction (a first direction) and laser beam LB is simultaneously caused to weave in the Y-direction (a second direction) intersecting the X-direction.

The welding step includes the first weaving step of causing laser beam LB to weave in the Y-direction with first amplitude $A_1$, and the second weaving step of causing laser beam LB to weave with a predetermined amplitude smaller than first amplitude $A_1$ at both end portions of a weaving trajectory drawn by laser beam LB in the first weaving step.

In the present exemplary embodiment, in the first weaving step, laser beam LB is caused to weave so as to draw the first weaving trajectory having a linear shape, along the Y-direction.

According to the present exemplary embodiment, at both end portions of the first weaving trajectory, laser beam LB is applied to workpiece 200 by causing laser beam LB to weave in the Y-direction, which is the same direction as the direction in the first weaving step. As a result, it is possible to increase heat input from laser beam LB to workpiece 200 at both end portions of the first weaving trajectory. This will be further described.

Figure 5A:
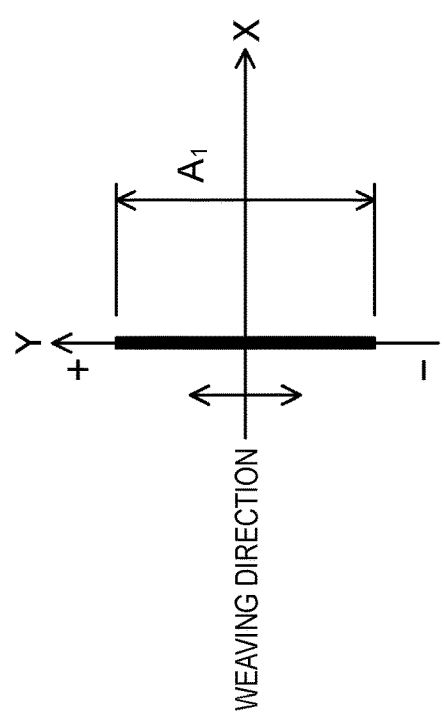
FIG. 5A is a diagram illustrating a weaving trajectory of a laser beam according to a first comparative example.
Figure 5B:
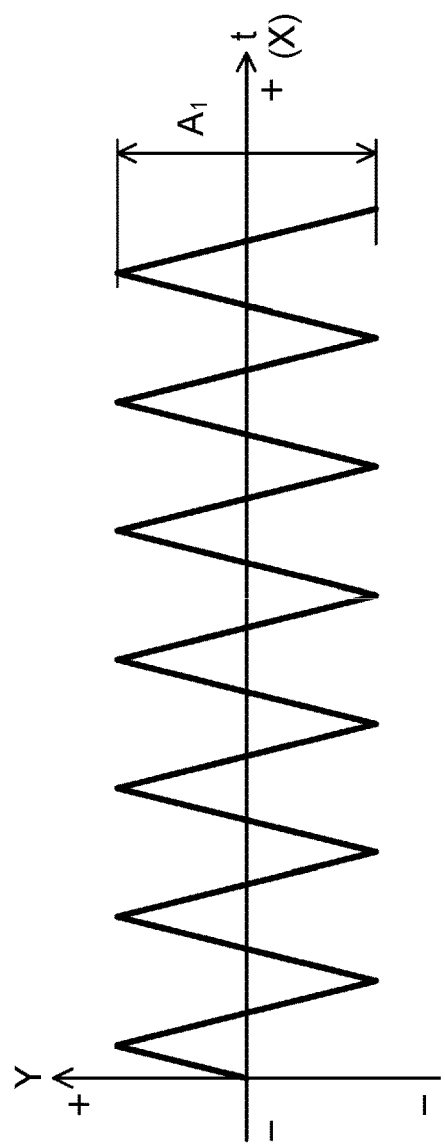
FIG. 5B is a diagram illustrating a temporal change in the weaving trajectory of the laser beam according to the first comparative example.

FIG. 5 illustrates a weaving trajectory of a laser beam according to a first comparative example and a temporal change therein. Parts (a) and (b) of FIG. 5 correspond to parts (a) and (b) of FIG. 4, respectively. That is, part (a) of FIG. 5 illustrates a weaving trajectory of laser beam LB in a state where the position of laser head 30 is fixed. Part (b) of FIG. 5 illustrates a temporal change in the weaving trajectory, that is, the weaving trajectory of laser beam LB on the surface of workpiece 200 when laser head 30 is caused to move in the X-direction at a constant speed.

Note that each of parts (a) and (b) in each of FIGS. 6 to 9, 11, and 12 illustrated below also corresponds to a corresponding one of parts (a) and (b) of FIG. 4, and a similar relationship applies therebetween.

The weaving trajectory of laser beam LB illustrated in FIG. 5 corresponds to one in conventional weaving. That is, although laser beam LB is caused to weave by linearly reciprocating laser beam LB along the Y-direction, further weaving of laser beam LB is not performed at end portions of the linear weaving trajectory.

In such a case, as described above, a lot of heat is diffused from a molten portion in workpiece 200 to the surrounding portion, at the end portions of the linear weaving trajectory. At the end portions of the weaving trajectory, the presence time of laser beam LB is shorter than the presence time of laser beam LB at the central portion in weaving. Thus, the end portions receive smaller input energy. As a result, edges of weld bead 300 corresponding to the respective end portions of the linear weaving trajectory receive insufficient heat input. Thus, weld penetration in workpiece 200 becomes insufficient. Therefore, the shapes of the edges of weld bead 300 may be deteriorated.

In contrast, according to the present exemplary embodiment, it is possible to increase heat input from laser beam LB to workpiece 200 at both end portions of the linear first weaving trajectory, as compared with the conventional method illustrated in FIG. 5. As a result, it is possible to make the shapes of the edges of weld bead 300 smooth and uniform, and thus it is possible to form weld bead 300 having an excellent shape.

The first weaving step and the second weaving step are alternately performed.

As illustrated in FIG. 3A, when workpiece 200 includes two plate members 210, 220 having respective end surfaces that are butted against each other, laser welding is performed by applying, according to the method described above, laser beam LB to the portion at which two plate members 210, 220 are butted against each other. As illustrated in FIG. 3B, when workpiece 200 includes two plate members 230, 240, which are overlapped with each other with the respective end surfaces thereof shifted from each other, laser welding is performed by applying, according to the method described above, laser beam LB to the corner of the portion at which two plate members 230, 240 are overlapped with each other.

In workpiece 200 illustrated in FIG. 3A, when the thickness of first plate member 210 is different from the thickness of second plate member 220, thermal imbalance may occur at both end portions of the linear weaving trajectory in a case where the method illustrated in FIG. 5 is used. In the lap fillet welding illustrated in FIG. 3B, a similar thermal imbalance also occurs between an end portion on a side of third plate member 230 and an end portion on a side of fourth plate member 240.

In contrast, according to the present exemplary embodiment, it is possible to eliminate such a thermal imbalance. That is, the thermal imbalance can be eliminated by, for example, making an amplitude of laser beam LB at one end portion of the first weaving trajectory larger than an amplitude of laser beam LB at the other end portion thereof, in the second weaving step, and thus by allowing the presence time of laser beam LB to be longer at the one end portion. As a result, it is possible to form weld bead 300 having an excellent shape, even in the butt welding illustrated in FIG. 3A or in the lap fillet welding illustrated in FIG. 3B.

According to the present exemplary embodiment, it is possible to melt sufficient amount of metal for filling a gap by applying laser beam LB, thus forming weld bead 300 having an excellent shape, even in a case, such as butt welding illustrated in FIG. 3A, where the gap is likely to be formed at a welding portion of workpiece 200.

According to the present exemplary embodiment, it is possible to further improve the shape of weld bead 300 by changing third amplitude $A_3$ and fourth amplitude $A_4$ in accordance with the form, the material, or the like of workpiece 200. For example, when workpiece 200 is made of a material allowing heat to be easily diffused therefrom, it is possible to ensure the amount of heat input at both end portions of the first weaving trajectory by increasing third amplitude $A_3$ and fourth amplitude $A_4$. When workpiece 200 is made of a material from which heat is less likely to be diffused, it is possible to reduce excessive heat input at both end portions of the first weaving trajectory by reducing third amplitude $A_3$ and fourth amplitude $A_4$, thus making the shapes of the edges of weld bead 300 smooth and uniform.

Laser welding device 100 according to the present exemplary embodiment includes laser oscillator 10 that generates laser beam LB, laser head 30 that receives laser beam LB and that applies laser beam LB to workpiece 200, and controller 50 that controls the operation of laser head 30.

Laser head 30 includes laser beam scanner 40 that performs scanning with laser beam LB in each of the X-direction (the first direction) and the Y-direction (the second direction) intersecting the X-direction. Laser beam scanner 40 performs scanning with laser beam LB at least in the Y-direction.

Controller 50 drive-controls laser beam scanner 40 so as to cause laser beam LB to weave in the Y-direction with first amplitude $A_1$. Controller 50 also drive-controls laser beam scanner 40 so as to cause laser beam LB to weave with a predetermined amplitude smaller than first amplitude $A_1$ at both end portions of a weaving trajectory, with first amplitude $A_1$, drawn by laser beam LB.

In the present exemplary embodiment, controller 50 drive-controls laser beam scanner 40 so as to cause laser beam LB to draw the first weaving trajectory having a linear shape with first amplitude $A_1$. Controller 50 further drive-controls laser beam scanner 40 so as to cause laser beam LB to draw the third weaving trajectory having a linear shape with third amplitude $A_3$ at the one end portion (the end portion in the +Y-direction) of the first weaving trajectory, and so as to cause laser beam LB to draw the fourth weaving trajectory having a linear shape with fourth amplitude $A_4$ at the other end portion (the end portion in the −Y-direction) of the first weaving trajectory.

With such a configuration of Laser welding device 100, particularly controller 50, it is possible to increase heat input from laser beam LB to workpiece 200 at both end portions of the first weaving trajectory. As a result, it is possible to make the shapes of the edges of weld bead 300 smooth and uniform, and thus it is possible to form weld bead 300 having an excellent shape.

Controller 50 drive-controls laser beam scanner 40 so as to cause laser beam LB to weave with first amplitude $A_1$ and to weave with a predetermined amplitude in an alternately repeated manner.

Laser welding device 100 further includes manipulator 60 to which laser head 30 is attached, and controller 50 controls the operation of manipulator 60. Manipulator 60 causes laser head 30 to move in a predetermined direction with respect to the surface of workpiece 200.

By providing manipulator 60 in this manner, it is possible to change the welding direction of laser beam LB. It is also possible to easily perform laser welding on workpiece 200 having a complex form, for example, a three-dimensional form.

Laser oscillator 10 and laser head 30 are connected via optical fiber 20, and laser beam LB is transmitted from laser oscillator 10 to laser head 30 via optical fiber 20.

By providing optical fiber 20 in this manner, it is possible to perform laser welding on workpiece 200 disposed at a position away from laser oscillator 10. As a result, it is possible to increase a degree of freedom in arranging each component of laser welding device 100.

Laser beam scanner 40 includes first galvano-mirror 41 that performs scanning with laser beam LB in the X-direction, and second galvano-mirror 42 that performs scanning with laser beam LB in the Y-direction.

With such a configuration of laser beam scanner 40, it is possible to easily perform one-dimensional or two-dimensional scanning with laser beam LB. As a result, it is possible to cause laser beam LB to weave easily. The known galvano-scanner is used for laser beam scanner 40, and thus it is possible to suppress an increase in cost of laser welding device 100.

First Modified Example

Figure 6A:
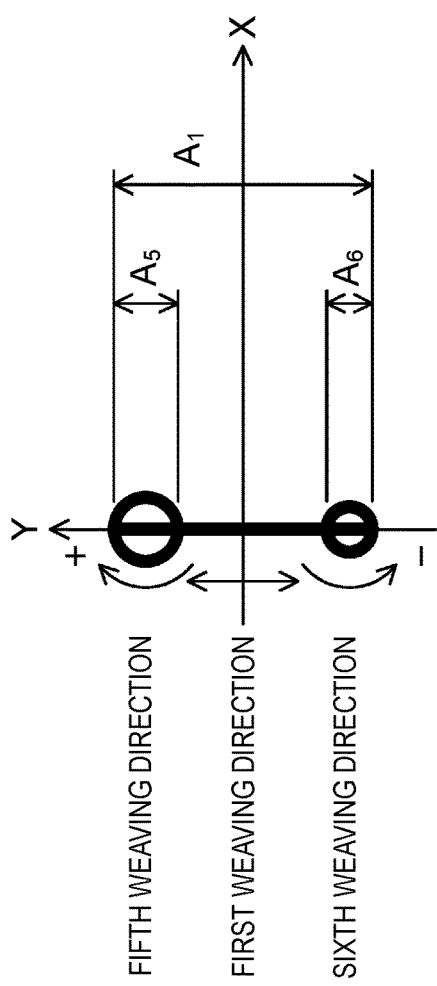
FIG. 6A is a diagram illustrating each weaving trajectory of a laser beam according to a first modified example.
Figure 6B:
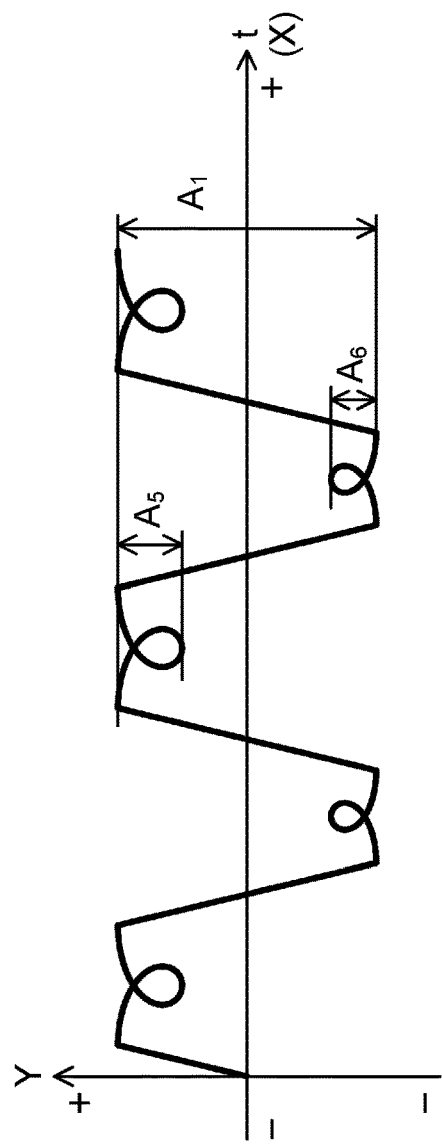
FIG. 6B is a diagram illustrating a temporal change in the weaving trajectory of the laser beam according to the first modified example.

FIG. 6 illustrates each weaving trajectory of a laser beam according to the present modified example and a temporal change therein.

A method in the present modified example is different from the method described in the first exemplary embodiment in the following point. That is, in the second weaving step, laser beam LB is caused to weave so as to draw weaving trajectories having a circular shape, at both end portions of the first weaving trajectory illustrated in part (a) of FIG. 4.

At the end portion in the +Y-direction of the first weaving trajectory, laser beam LB is caused to weave so as to draw a fifth weaving trajectory having a circular shape (fifth weaving). The weaving direction of laser beam LB, that is, the rotation direction of laser beam LB in this case is the clockwise direction. Fifth amplitude $A_5$ corresponding to the diameter of the fifth weaving trajectory is smaller than first amplitude $A_1$. At the end portion in the −Y-direction of the first weaving trajectory, laser beam LB is caused to weave so as to draw a sixth weaving trajectory having a circular shape (sixth weaving). The scanning direction (the rotation direction) of laser beam LB in this case is the counterclockwise direction. Sixth amplitude $A_6$ corresponding to the diameter of the sixth weaving trajectory is smaller than first amplitude $A_1$.

Fifth amplitude $A_5$ may be the same as sixth amplitude $A_6$ or different from sixth amplitude $A_6$. For example, fifth amplitude $A_5$ may be larger than sixth amplitude $A_6$ or smaller than sixth amplitude $A_6$. In any of these cases, it is preferable that the sum of fifth amplitude $A_5$ and sixth amplitude $A_6$ is smaller than first amplitude $A_1$, and it is more preferable that the sum of fifth amplitude $A_5$ and sixth amplitude $A_6$ is smaller than or equal to half of first amplitude $A_1$.

It is possible to achieve effects similar to those achieved by the method illustrated in the first exemplary embodiment, also in the laser welding method according to the present modified example. That is, it is possible to increase heat input from laser beam LB to workpiece 200 at both end portions of the first weaving trajectory. As a result, it is possible to make the shapes of the edges of weld bead 300 smooth and uniform, and thus it is possible to form weld bead 300 having an excellent shape. It is also possible to form weld bead 300 having an excellent shape in the butt welding illustrated in FIG. 3A or in the lap fillet welding illustrated in FIG. 3B.

In the second weaving step, laser beam LB is caused to weave in the counterclockwise direction at the end portion in the +Y-direction, and laser beam LB is caused to weave in the clockwise direction at the end portion in the −Y-direction.

With these weaving operations, it is possible to prevent the weaving trajectory of laser beam LB from unnecessarily protruding in the Y-direction on the surface of workpiece 200, as illustrated in part (b) of FIG. 6. As a result, it is possible to set the width of weld bead 300 to a desired value, and it is also possible to form weld bead 300 having an excellent shape.

In laser welding device 100 according to the present modified example, controller 50 drive-controls laser beam scanner 40 so as to cause the laser beam to linearly weave in the Y-direction with first amplitude $A_1$. Controller 50 further drive-controls laser beam scanner 40 so as to cause the laser beam to weave in a circular manner with fifth amplitude $A_5$ or with sixth amplitude $A_6$, at both end portions of the first weaving trajectory.

According to the present modified example, it is possible to achieve effects similar to those achieved by the configuration illustrated in the first exemplary embodiment. That is, it is possible to increase heat input from laser beam LB to workpiece 200 at both end portions of the first weaving trajectory. As a result, it is possible to make the shapes of the edges of weld bead 300 smooth and uniform, and thus it is possible to form weld bead 300 having an excellent shape.

Second Modified Example

Figure 7A:
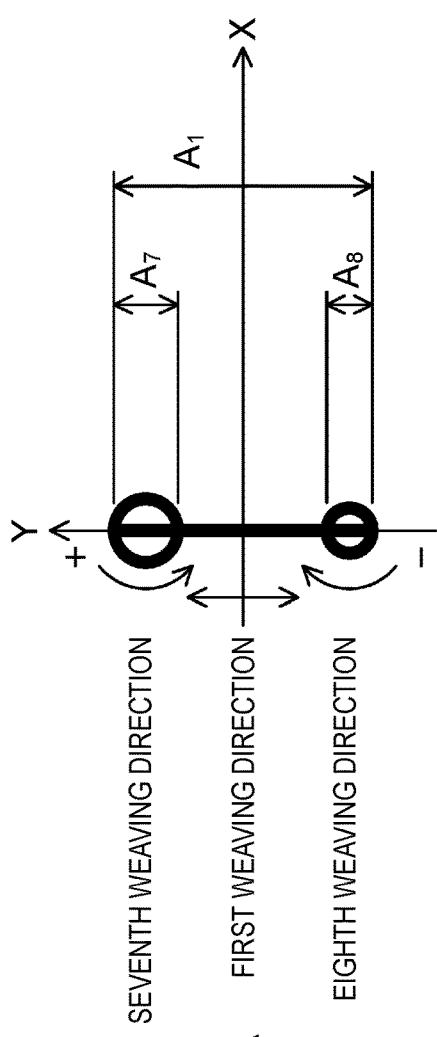
FIG. 7A is a diagram illustrating each weaving trajectory of a laser beam according to a second modified example.
Figure 7B:
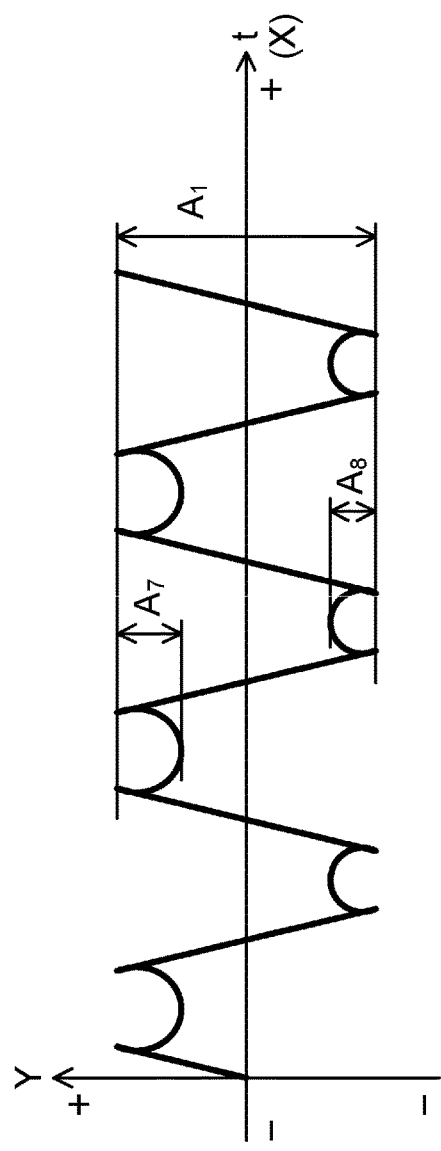
FIG. 7B is a diagram illustrating a temporal change in the weaving trajectory of the laser beam according to the second modified example.

FIG. 7 illustrates each scanning trajectory of a laser beam according to the present modified example and a temporal change therein.

A method and a configuration in the present modified example are different from the method and the configuration illustrated in the first modified example in the following points. That is, in the second weaving step, laser beam LB is caused to weave in the counterclockwise direction so as to draw a seventh weaving trajectory having a circular shape at the end portion in the +Y-direction of the first weaving trajectory (seventh weaving). In the second weaving step, laser beam LB is also caused to weave in the clockwise direction so as to draw an eighth weaving trajectory having a circular shape at the end portion in the −Y-direction of the first weaving trajectory (eighth weaving).

Each of seventh amplitude $A_7$ corresponding to the diameter of the seventh weaving trajectory, and eighth amplitude $A_8$ corresponding to the diameter of the eighth weaving trajectory is smaller than first amplitude $A_1$. Seventh amplitude $A_7$ may be the same as eighth amplitude $A_8$ or different from eighth amplitude $A_8$. For example, seventh amplitude $A_7$ may be larger than eighth amplitude $A_8$ or smaller than eighth amplitude $A_8$. In any of these cases, it is preferable that the sum of seventh amplitude $A_7$ and eighth amplitude $A_8$ is smaller than first amplitude $A_1$, and it is more preferable that the sum of seventh amplitude $A_7$ and eighth amplitude $A_8$ is smaller than or equal to half of first amplitude $A_1$.

According to the present modified example, it is also possible to achieve effects similar to those achieved by the configuration illustrated in the first exemplary embodiment. That is, it is possible to increase heat input from laser beam LB to workpiece 200 at both end portions of the first weaving trajectory. As a result, it is possible to make the shapes of the edges of weld bead 300 smooth and uniform, and thus it is possible to form weld bead 300 having an excellent shape.

Selection from among the method illustrated in the first modified example or the method illustrated in the present modified example is based on selection from among the heat input distribution or the bead shape at both end portions of the first weaving trajectory. The selection from among the heat input distribution or the bead shape is appropriately determined in accordance with the material or the form of workpiece 200, dimensional constraint required for weld bead 300, and the like.

Third Modified Example

Figure 8A:
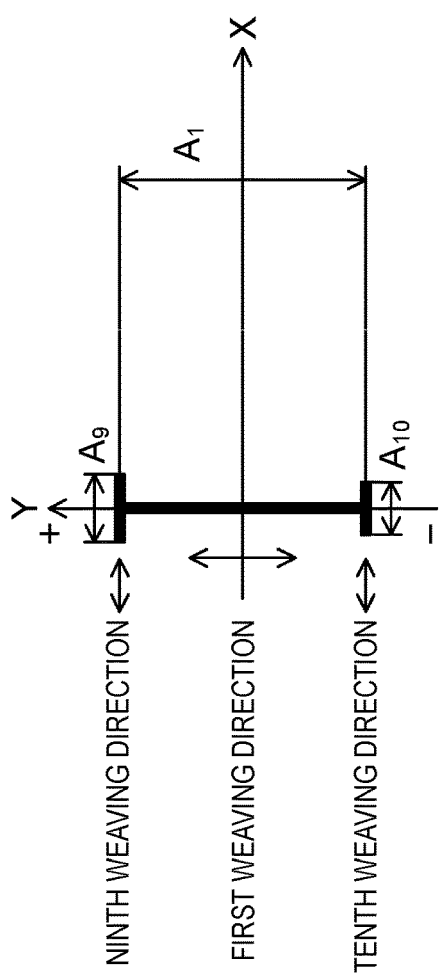
FIG. 8A is a diagram illustrating each weaving trajectory of a laser beam according to a third modified example.
Figure 8B:
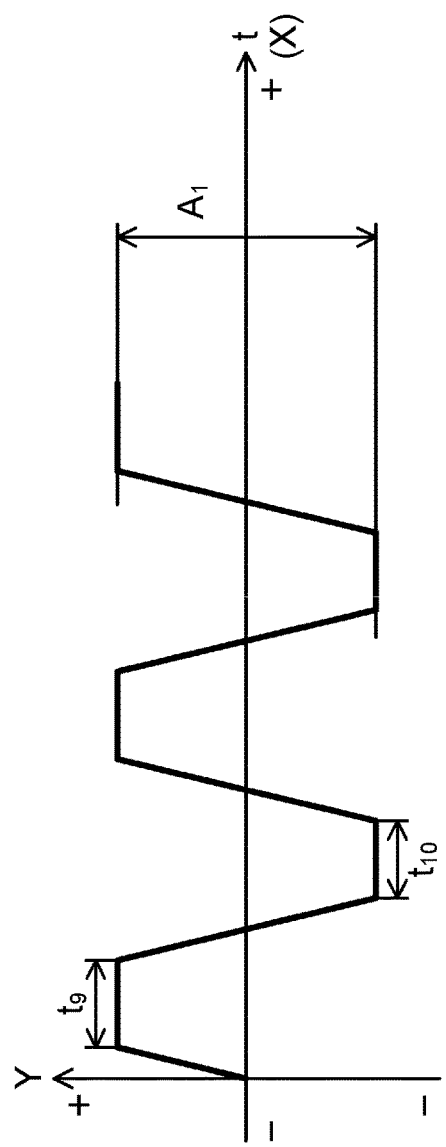
FIG. 8B is a diagram illustrating a temporal change in the weaving trajectory of the laser beam according to the third modified example.
Figure 9:
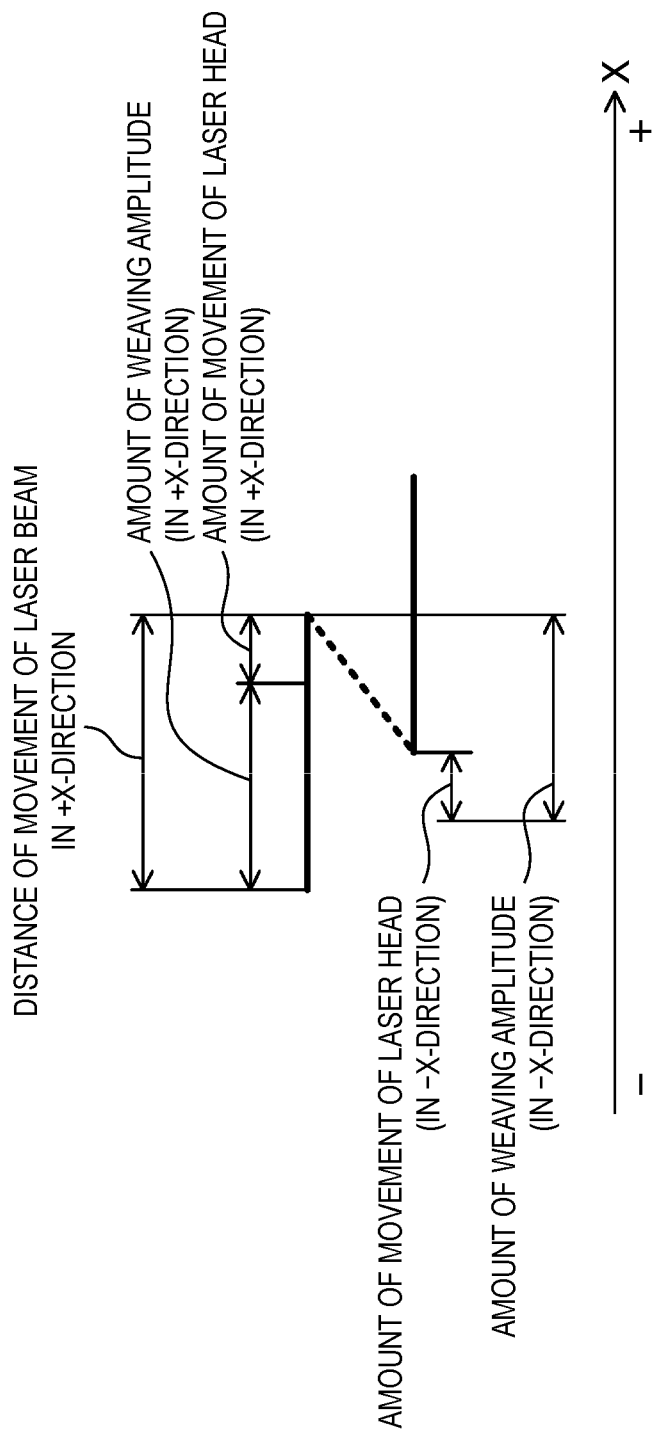
FIG. 9 is a diagram illustrating contribution of each component to the weaving trajectory of the laser beam according to the third modified example.

FIG. 8 illustrates each weaving trajectory of a laser beam according to the present modified example and a temporal change therein. FIG. 9 illustrates contribution of each component to the weaving trajectory of the laser beam.

A method and a configuration in the present modified example are different from the method and the configuration illustrated in the first exemplary embodiment in the following point. That is, laser beam LB is caused to weave by reciprocating laser beam LB in the X-direction in the second weaving step. Specifically, at the end portion in the +Y-direction of the first weaving trajectory, laser beam LB is caused to weave by reciprocating laser beam LB in the X-direction with ninth amplitude $A_9$ (ninth weaving). At the end portion in the −Y-direction of the first weaving trajectory, laser beam LB is caused to weave by reciprocating laser beam LB in the X-direction with tenth amplitude $A_{10}$ (tenth weaving).

Ninth amplitude $A_9$ may be the same as tenth amplitude $A_{10}$ or different from tenth amplitude $A_{10}$. For example, ninth amplitude $A_9$ may be larger than tenth amplitude $A_{10}$ or smaller than tenth amplitude $A_{10}$.

As illustrated in part (b) of FIG. 8, the weaving trajectory of laser beam LB on the time axis is not subjected to a directional change toward the Y-direction at each vertex of the triangular waveform, in the present modified example. Instead, each vertex is extended on the time axis, and the weaving trajectory of laser beam LB on the time axis has a trapezoidal waveform. Laser beam LB is applied to the end portion in the +Y-direction of the weaving trajectory of laser beam LB on the time axis during ninth weaving time $t_9$. Laser beam LB is applied to the end portion in the −Y-direction of the weaving trajectory of laser beam LB on the time axis during tenth weaving time $t_{10}$.

According to the present modified example, it is also possible to achieve effects similar to those achieved by the configuration illustrated in the first exemplary embodiment. That is, it is possible to increase heat input from laser beam LB to workpiece 200 at both end portions of the first weaving trajectory by applying laser beam LB, for a time longer than the time in the first exemplary embodiment, to both end portions of the first weaving trajectory. As a result, it is possible to make the shapes of the edges of weld bead 300 smooth and uniform, and thus it is possible to form weld bead 300 having an excellent shape.

In particular, according to the present modified example, a lot of heat can be further input only to the portions at which laser beam LB is applied, at both end portions of the first weaving trajectory. As a result, it is possible to make the shapes of the edges of weld bead 300 smooth and excellent.

In the present modified example, the advancement direction (the welding direction) of laser beam LB, and the weaving direction of laser beam LB in the second weaving step are parallel, and, that is, are oriented in the same direction, i.e., the X-direction.

For this reason, as illustrated in FIG. 9, respective, actual weaving amplitudes of laser beam LB are determined by adding respective distances of movement of manipulator 60, corresponding to the weaving cycle, to ninth amplitude $A_9$ and tenth amplitude $A_{10}$, which have been described above.

Fourth Modified Example

FIG. 10 illustrates an example of combinations of weaving methods of a laser beam according to the present modified example.

Another modified example can be formed by appropriately combining each weaving trajectory of laser beam LB in the second weaving step illustrated in FIGS. 4, and 6 to 8.

Although not illustrated in the first exemplary embodiment and the first to third modified examples, circles illustrated in FIG. 10 correspond to feasible combinations. For example, the fifth weaving may be performed at the end portion in the +Y-direction of the first weaving trajectory, while the eighth weaving may be performed at the end portion in the −Y-direction of the first weaving trajectory.

That is, as illustrated in FIG. 10, the weaving trajectory of laser beam LB at the end portion in the +Y-direction of the first weaving trajectory may be any one of the third, fifth, seventh, and ninth weaving trajectories illustrated in FIGS. 4, and 6 to 8. The weaving trajectory of laser beam LB at the end portion in the −Y-direction of the first weaving trajectory may be any one of the fourth, sixth, eighth, and tenth weaving trajectories illustrated in FIGS. 4, and 6 to 8.

Weaving directions of laser beam LB in the second weaving step may be different between the one end portion and the other end portion of the first weaving trajectory. For example, laser LB may be caused to weave in the Y-direction at the one end portion, while laser LB may be caused to weave in the X-direction at the other end portion. Laser LB may be caused to weave in the clockwise direction at the one end portion, while laser LB may be caused to weave in the counterclockwise direction at the other end portion. Amplitudes of laser beam LB in the second weaving step may be different between the one end portion and the other end portion of the first weaving trajectory.

As described above, the weaving trajectory of laser beam LB in the second weaving step can be appropriately selected in accordance with the material or the form of workpiece 200, the dimensional constraint required for weld bead 300, and the like.

That is, controller 50 of laser welding device 100 drive-controls laser beam scanner 40 so as to cause laser beam LB to draw the first weaving trajectory having a linear shape with first amplitude $A_1$ in the Y-direction.

Controller 50 further drive-controls laser beam scanner 40 so as to cause laser beam LB to weave in the X-direction or the Y-direction, or to weave in a circular manner, with a predetermined amplitude at at least one of both end portions of the first weaving trajectory.

Second Exemplary Embodiment

Figure 11A:
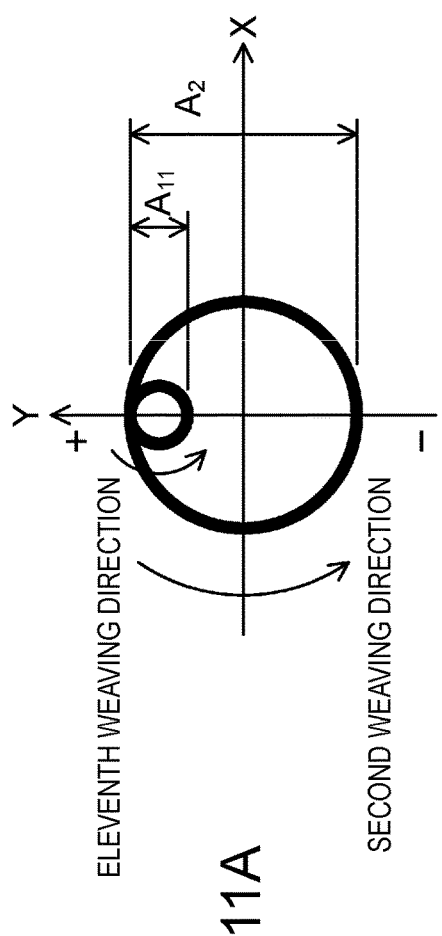
FIG. 11A is a diagram illustrating each weaving trajectory of a laser beam according to a second exemplary embodiment.
Figure 11B:
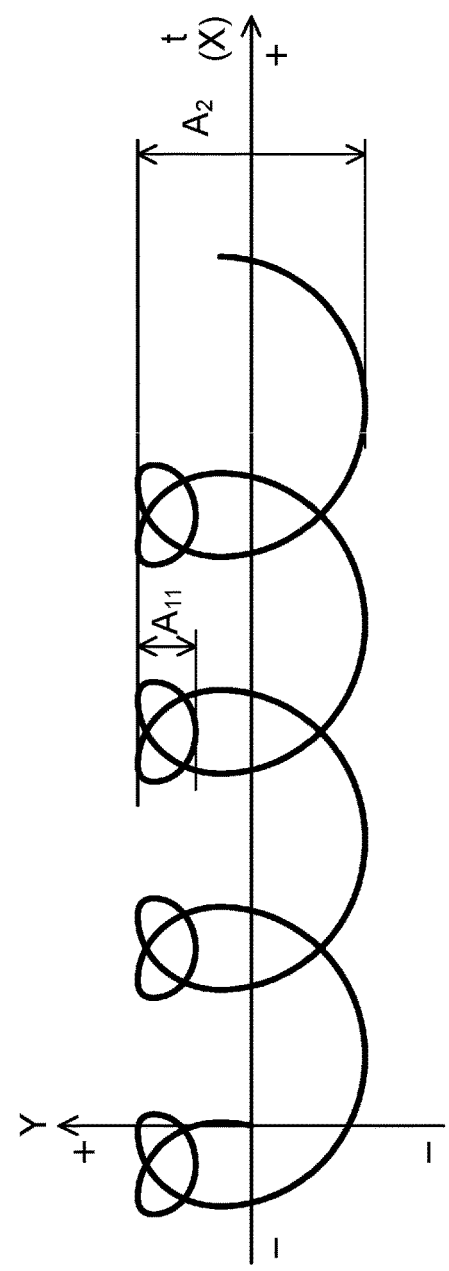
FIG. 11B is a diagram illustrating a temporal change in the weaving trajectory of the laser beam according to the second exemplary embodiment.
Figure 12A:
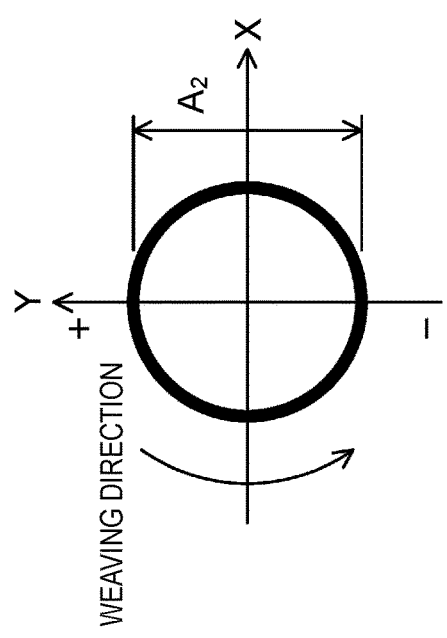
FIG. 12A is a diagram illustrating a weaving trajectory of a laser beam according to a second comparative example.
Figure 12B:
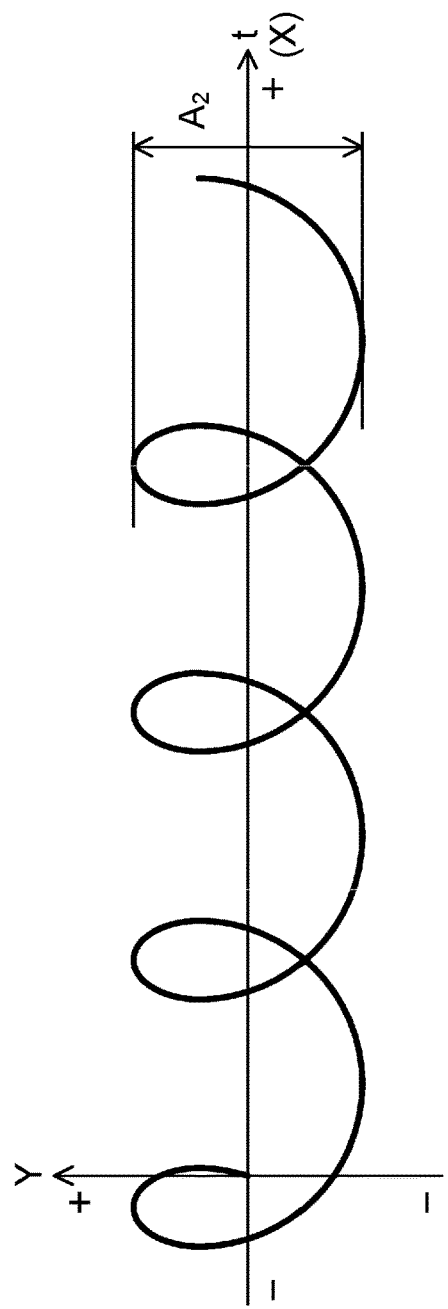
FIG. 12B is a diagram illustrating a temporal change in the weaving trajectory of the laser beam according to the second comparative example.

FIG. 11 illustrates each weaving trajectory of a laser beam according to the present exemplary embodiment and a temporal change therein. FIG. 12 illustrates a weaving trajectory of a laser beam according to a second comparative example and a temporal change therein.

As illustrated in part (a) of FIG. 11, a method and a device in the present exemplary embodiment are different from the method and the device illustrated in the first exemplary embodiment in the following point. That is, laser beam LB is caused to weave so as to draw a second weaving trajectory having a circular shape (second weaving) in the first weaving step. The rotation direction of the second weaving trajectory is the counterclockwise direction.

At the start point of the second weaving trajectory, that is, at an end portion in the +Y-direction of the second weaving trajectory illustrated in part (a) of FIG. 11, laser beam LB is further caused to weave so as to draw an eleventh weaving trajectory having a circular shape (eleventh weaving). The operation of the eleventh weaving is also referred to as the second weaving step.

The rotation direction of the eleventh weaving trajectory is also the counterclockwise direction. Eleventh amplitude $A_{11}$ corresponding to the diameter of the eleventh weaving trajectory is smaller than second amplitude $A_2$ corresponding to the diameter of the second weaving trajectory.

According to the present exemplary embodiment, it is possible to achieve effects similar to those achieved by the configuration illustrated in the first exemplary embodiment. That is, it is possible to increase heat input from laser beam LB to workpiece 200 at the start point of the second weaving trajectory, which is, in part (b) of FIG. 11, the end portion in the +Y-direction of the helical weaving trajectory of laser beam LB. As a result, it is possible to make the shapes of the edges of weld bead 300 smooth and uniform, and thus it is possible to form weld bead 300 having an excellent shape.

That is, according to the present exemplary embodiment, the trajectory of laser beam LB becomes a combined trajectory including the two types of rotation trajectories in the counterclockwise direction, at the end portion in the +Y-direction of the helical weaving trajectory, as illustrated in part (b) of FIG. 11. As a result, it is possible to reduce occurrence of an imbalance in heat input at the end portion. This will be further described.

For example, a case is examined where laser beam LB is caused to weave so as to draw a circular weaving trajectory in the counterclockwise direction, as illustrated in part (a) of FIG. 12. In this case, laser beam LB is caused to weave so as to draw a weaving trajectory having a helical shape on the time axis, that is, in the +X-direction, as illustrated in part (b) of FIG. 12. At the end portion in the +Y-direction of the helical weaving trajectory, the direction of the trajectory of laser beam LB is always the counterclockwise direction.

However, when laser beam LB is caused to weave so as to draw the weaving trajectory illustrated in part (b) of FIG. 12, an imbalance occurs in heat input between the end portion in the +Y-direction and the end portion in the −Y-direction of the bead. This is because when laser beam LB is applied to the surface of workpiece 200, the end portion in the +Y-direction has the presence period of laser beam LB shorter than the presence period of laser beam LB at the end portion in the −Y-direction. When such an imbalance occurs, the edge of weld bead 300 may have an unbalanced shape, particularly at the end portion in the +Y-direction.

In contrast, according to the present exemplary embodiment, two types of weaving in the counterclockwise direction of laser beam LB are combined at the end portion in the +Y-direction of the helical weaving trajectory. Thus, as described above, it is possible to reduce occurrence of an imbalance in heat input at this end portion. As a result, it is possible to make the shape of the edge of weld bead 300 smooth, and thus it is possible to form weld bead 300 having an excellent shape.

The weaving trajectory of laser beam LB in the second weaving step in the present exemplary embodiment is not particularly limited to the weaving trajectory illustrated in FIG. 11. For example, laser beam LB may be caused to weave so as to draw any one of the third, fifth, seventh, and ninth weaving trajectories described in the first exemplary embodiment and the first to third modified examples.

In the description of FIG. 11, the rotation direction of each of the second weaving and the eleventh weaving has been described as the counterclockwise direction. However, the clockwise direction may be appropriately selected for the rotation direction of each of the second weaving and the eleventh weaving, in accordance with the material, the joint form, or the like of workpiece 200.

That is, controller 50 of laser welding device 100 according to the present exemplary embodiment drive-controls laser beam scanner 40 so as to cause laser beam LB to draw the second weaving trajectory having a circular shape.

Controller 50 further drive-controls laser beam scanner 40 so as to cause the laser beam to weave in the X-direction or the Y-direction, or to weave in a circular manner, with a predetermined amplitude at the start point of the second weaving trajectory.

Third Exemplary Embodiment

Figure 13:
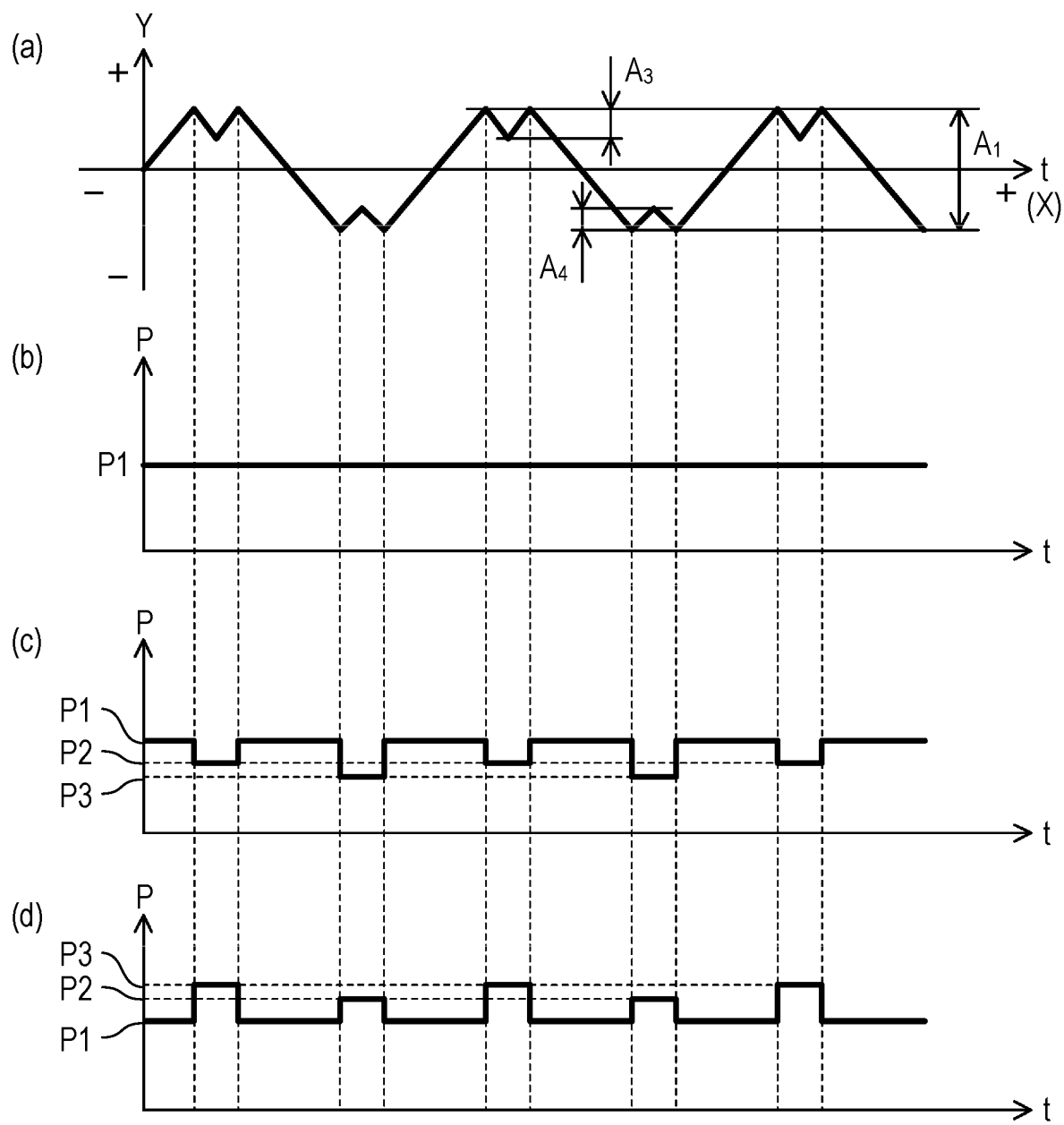
FIG. 13 is a diagram illustrating temporal changes in a weaving trajectory of a laser beam and output of the laser beam, according to a third exemplary embodiment.

FIG. 13 illustrates temporal changes in a weaving trajectory of a laser beam and output of the laser beam, according to a third exemplary embodiment. Part (a) of FIG. 13 is the same as part (b) of FIG. 4.

A method and a device in the present exemplary embodiment are different from the methods and the device illustrated in the first and second exemplary embodiments in the following point. That is, output of laser beam LB is caused to change between the first weaving step and the second weaving step.

For example, in the method illustrated in the first exemplary embodiment, output of laser beam LB is constant (=P1) both in the first weaving step and in the second weaving step, as illustrated in part (b) of FIG. 13.

However, depending on the form or the material of workpiece 200, heat input from laser beam LB may be insufficient or excessive at the welding portion. For example, in FIG. 3A, when first plate member 210 and second plate member 220 are greatly different in plate thickness, heat input may be excessive on a side with a thinner plate thickness, while heat input may be insufficient on a side with a thicker plate thickness. In this case, besides deterioration of the shapes of the edges of weld bead 300, welding defects may occur such as burn-through and a lack of fusion in the plate members.

In contrast, according to the present exemplary embodiment, it is possible to reduce the defects described above by causing the output of laser beam LB to change at each of both end portions of the linear first weaving trajectory, in accordance with the form or the material of workpiece 200.

For example, as illustrated in part (c) of FIG. 13, in the second weaving step, the output of laser beam LB may be set lower than the output of laser beam LB in the first weaving step. For example, when the form of workpiece 200 is a structure in which two plate members having different plate thicknesses are butted against each other, output at one end portion in the Y-direction of the first weaving trajectory may be set lower than output at the other end portion in the Y-direction of the first weaving trajectory. In the example illustrated in part (c) of FIG. 13, the output of laser beam LB at the end portion in the +Y-direction of the first weaving trajectory is set as P2 that is lower than P1. The output of laser beam LB at the end portion in the −Y-direction of the first weaving trajectory is set as P3 that is lower than P2.

As illustrated in part (d) of FIG. 13, in the second scanning step, the output of laser beam LB may be set higher than the output of laser beam LB in the first scanning step. In the example illustrated in part (d) of FIG. 13, the output of laser beam LB at the end portion in the −Y-direction of the first weaving trajectory is set as P2 that is higher than P1. The output of the laser beam LB at the end portion in the +Y-direction of the first weaving trajectory is set as P3 that is higher than P2.

With these settings, it is possible to increase the amount of heat input to the edges of weld bead 300, and thus it is possible to form a weld bead having an excellent shape in accordance with the material or the form of workpiece 200.

In the example illustrated in part (c) of FIG. 13, the output of laser beam LB at the end portion in the +Y-direction of the first weaving trajectory may be set as P3, and the output of laser beam LB at the end portion in the −Y-direction of the first weaving trajectory may be set as P2. In this example, P2 and P3 may be set to the same value. In the example illustrated in part (d) of FIG. 13, the output of laser beam LB at the end portion in the −Y-direction of the first weaving trajectory may be set as P3, and the output of laser beam LB at the end portion in the +Y-direction of the first weaving trajectory may be set as P2. In this example, P2 and P3 may be set to the same value.

The output of laser beam LB may be caused to change compared to a value set in the first scanning step, only at any one of the end portion in the +Y-direction or the end portion in the −Y-direction of the first weaving trajectory.

That is, controller 50 of laser welding device 100 according to the present exemplary embodiment controls the operation of laser oscillator 10. Controller 50 drive-controls laser oscillator 10 so as to cause the output of laser beam LB to change at at least one of both end portions of the first weaving trajectory.

Controller 50 may drive-control laser oscillator 10 so as to cause the output of laser beam LB to change between the one end portion and the other end portion of the first weaving trajectory.

Other Exemplary Embodiments

Another exemplary embodiment can be formed by appropriately combining the constituent elements described in the first to third exemplary embodiments and the first to fourth modified examples. For example, in the first to fourth modified examples, the output of laser beam LB may be changed between the one end portion, the other end portion, or both end portions of the first weaving trajectory, and the rest of the first weaving trajectory. In the second exemplary embodiment, the output of laser beam LB may be changed between the start point and another portion of the second weaving trajectory.

In the first exemplary embodiment and the first to fourth modified examples, each weaving trajectory of laser beam LB on the time axis in the first weaving step has a triangular waveform, but may have a sinusoidal waveform. In the first and third exemplary embodiments, each weaving trajectory of laser beam LB on the time axis in the second weaving step has a triangular waveform, but may have a sinusoidal waveform.

In the description of the first and third exemplary embodiments, the number of weaving times in the second weaving step has been described as one, but the number of weaving times in the second weaving step may be plural.

In the example illustrated in FIG. 1, condenser lens 34 is disposed at a stage prior to laser beam scanner 40, but may be disposed at a stage subsequent to laser beam scanner 40, that is, a position between laser beam scanner 40 and a beam emission port of laser head 30.

INDUSTRIAL APPLICABILITY

The laser welding method and the laser welding method according to the present disclosure are useful because it is possible to form a weld bead having an excellent shape.

REFERENCE MARKS IN THE DRAWINGS

10 laser oscillator
20 optical fiber
30 laser head
31 housing
32 collimation lens
33 reflection mirror
34 condenser lens
40 laser beam scanner
41 first galvano-mirror
41a first mirror
41b first rotation shaft
41c first drive portion
42 second galvano-mirror
42a second mirror
42b second rotation shaft
42c second drive portion
100 laser welding device
200 workpiece
300 weld bead

The invention claimed is:

1. A laser welding method comprising a welding step of applying a laser beam to a surface of a workpiece while the laser beam is caused to advance in a first direction along a welding line and the laser beam is simultaneously caused to weave in a second direction intersecting the first direction, wherein the welding step includes:
   a first weaving step of causing the laser beam to weave in the second direction with a first amplitude; and
   a second weaving step of causing the laser beam to weave with a predetermined amplitude smaller than the first amplitude at least at one end portion of a weaving trajectory drawn by the laser beam in the first weaving step, wherein
   in the first weaving step, the laser beam is caused to weave to draw a first weaving trajectory having a linear shape along the second direction,
   in the second weaving step, the laser beam is caused to weave to draw a second weaving trajectory having a circular shape,
   in the second weaving step, when the laser beam is to a first side of the welding line in the second direction, the laser beam moves in a clockwise direction such that the second weaving trajectory having the circular shape forms a closed loop or moves in a counterclockwise direction such that the second weaving trajectory having the circular shape forms a concave-shaped line facing away from the welding line, and
   in the second weaving step, when the laser beam is to a second side of the welding line in the second direction, the laser beam moves in a counterclockwise direction such that the second weaving trajectory having the circular shape forms a closed loop or moves in a clockwise direction such that the second weaving trajectory having the circular shape forms a concave-shaped line facing away from the welding line.

2. The laser welding method according to claim 1, wherein, in the second weaving step, at least at one of both end portions of the first weaving trajectory, output of the laser beam is caused to change compared to a value set in the first weaving step.

3. The laser welding method according to claim 2, wherein the output of the laser beam is caused to change between one end portion and another end portion of the first weaving trajectory.

4. The laser welding method according to claim 1, wherein, in the second weaving step, the laser beam is caused to weave in the second direction, at least at one of both end portions of the first weaving trajectory having the having a linear shape drawn by the laser beam or at a start point of the second weaving trajectory having the circular shape drawn by the laser beam.

5. The laser welding method according to claim 4, wherein weaving directions of the laser beam in the second weaving step are different between one end portion and another end portion of the first weaving trajectory.

6. The laser welding method according to claim 1, wherein, in the second weaving step, the laser beam is caused to weave in the first direction, at least at one of both end portions of the first weaving trajectory having the linear shape drawn by the laser beam or at a start point of the second weaving trajectory having the circular shape drawn by the laser beam.

7. The laser welding method according to claim 1, wherein, in the second weaving step, the laser beam is caused to weave to draw the second weaving trajectory having the circular shape, at least at one of both end portions of the first weaving trajectory having the linear shape drawn by the laser beam or at a start point of the second weaving trajectory having the circular shape drawn by the laser beam.

8. The laser welding method according to claim 7, wherein, in the second weaving step, the laser beam is caused to weave in the clockwise direction at one end portion of the first weaving trajectory, and the laser beam is caused to weave in the counterclockwise direction at another end portion of the first weaving trajectory.

9. The laser welding method according to claim 7, wherein a weaving direction of the laser beam in the second weaving step is identical to or different from a weaving direction in a case where the laser beam is caused to draw the first weaving trajectory in the first weaving step.

10. The laser welding method according to claim 1, wherein amplitudes of the laser beam in the second weaving step are different between one end portion and another end portion of the first weaving trajectory having the linear shape drawn by the laser beam.

11. The laser welding method according to claim 1, wherein
    the workpiece includes two plate members having respective end surfaces that are butted against each other, and
    the laser beam is applied to a portion at which the two plate members are butted against each other.

12. The laser welding method according to claim 1, wherein
    the workpiece includes two plate members that are overlapped with each other with respective end surfaces of two plate members shifted from each other, and the laser beam is applied to a corner of a portion at which the two plate members are overlapped with each other.

13. A laser welding device comprising:
a laser oscillator that is configured to generate a laser beam;
a laser head that is configured to receive the laser beam, the laser head being configured to apply the laser beam to a workpiece; and
a controller that is configured to control operation of the laser head, wherein
the laser head includes a laser beam scanner that is configured to perform scanning at least in a second direction intersecting a first direction along a welding line that is an advancement direction of the laser beam, and
the controller is configured to drive-control the laser beam scanner to:
    perform a first weaving operation to cause the laser beam to weave in the second direction with a first amplitude; and
    perform a second weaving operation to cause the laser beam to weave with a predetermined amplitude smaller than the first amplitude at least at one end portion of a weaving trajectory, drawn by the laser-beam in the first weaving operation, wherein
in the first weaving operation, the laser beam is caused to weave to draw a first weaving trajectory having a linear shape along the second direction,
in the second weaving operation, the laser beam is caused to weave to draw a second weaving trajectory having a circular shape,
in the second weaving operation, when the laser beam is to a first side of the welding line in the second direction, the laser beam moves in a clockwise direction such that the second weaving trajectory having the circular shape forms a closed loop or moves in a counterclockwise direction such that the second weaving trajectory having the circular shape forms a concave-shaped line facing away from the welding line, and
in the second weaving operation, when the laser beam is to a second side of the welding line in the second direction, the laser beam moves in a counterclockwise direction such that the second weaving trajectory having the circular shape forms a closed loop or moves in a clockwise direction such that the second weaving trajectory having the circular shape forms a concave-shaped line facing away from the welding line.

14. The laser welding device according to claim 13, wherein the controller is configured to drive-control the laser beam scanner to:
    cause the laser beam to weave in the first direction or the second direction, or to weave in a circular manner, at least at one of both end portions of the first weaving trajectory.

15. The laser welding device according to claim 14, wherein the controller is configured to:
    further control operation of the laser oscillator; and
    drive-control the laser oscillator to cause output of the laser beam to change at least at one of both end portions of the first weaving trajectory.

16. The laser welding device according to claim 15, wherein the controller is configured to drive-control the laser oscillator to cause the output of the laser beam to change between one end portion and another end portion of the first weaving trajectory.

17. The laser welding device according to claim 13, wherein the controller is configured to drive-control the laser beam scanner to:
    cause the laser beam to weave in the first direction or the second direction, or to weave in a circular manner, at a start point of the second weaving trajectory.

18. The laser welding device according to claim 13, wherein the laser beam scanner includes a first galvano-mirror that is configured to perform scanning with the laser beam in the first direction, and a second galvano-mirror that is configured to perform scanning with the laser beam in the second direction.

19. The laser welding device according to claim 13, wherein the laser head further includes a focal position adjustment mechanism, and the focal position adjustment mechanism is configured to cause a focal position of the laser beam to change along a direction intersecting each of the first direction and the second direction.

* * * * *